(12) United States Patent
Duesterwald et al.

(10) Patent No.: US 12,518,760 B2
(45) Date of Patent: Jan. 6, 2026

(54) AUTOMATED COMPOSITE AGENT GENERATION BY IMPLICIT DERIVATION

(71) Applicant: INTERNATIONAL BUSINESS MACHINES CORPORATION, Armonk, NY (US)

(72) Inventors: Evelyn Duesterwald, Millwood, NY (US); Vatche Isahagian, Belmont, MA (US); Praveen Venkateswaran, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 18/360,722

(22) Filed: Jul. 27, 2023

(65) Prior Publication Data
US 2025/0037718 A1    Jan. 30, 2025

(51) Int. Cl.
*G10L 15/26* (2006.01)
*G06Q 50/14* (2012.01)
(Continued)

(52) U.S. Cl.
CPC .............. *G10L 15/26* (2013.01); *G06Q 50/14* (2013.01); *G10L 15/16* (2013.01); *G10L 2015/223* (2013.01)

(58) Field of Classification Search
None
See application file for complete search history.

(56) References Cited

U.S. PATENT DOCUMENTS

| 8,484,031 B1 * | 7/2013 | Yeracaris ............... G10L 15/30 704/270.1 |
| 11,238,115 B1 * | 2/2022 | Newman ............... G06F 16/337 |

(Continued)

OTHER PUBLICATIONS

J. Bandlamudi et al., "Towards Hybrid Automation by Bootstrapping Conversational Interfaces for IT Operation Tasks," InProceedings of the AAAI Conference on Artificial Intelligence, Jun. 26, 2023, vol. 37, No. 13, pp. 15654-15660.

(Continued)

*Primary Examiner* — Neeraj Sharma
(74) *Attorney, Agent, or Firm* — Harrity & Harrity, LLP

(57) ABSTRACT

Automated composite agent generation includes generating an agent cooperation graph (ACG) based on machine-human interactions between a user and digital agents pretrained to perform automated tasks. The ACG nodes represent digital agents connected by edges weighted according to cooperation densities. A composite sub-graph (CSG) whose nodes represent cooperating digital agents that cooperatively perform related tasks in response to multiple user requests is generated based on the cooperation densities. A composite agent configured to perform a composite process in response to a composite instruction is generated and includes a composite evaluator and composite actuator. The composite evaluator is generated based on the multiple requests using a language model. The composite actuator is generated using an automated processes compiler that compiles the related automated processes. The composite actuator of the composite agent actuates the composite process, which performs the related automated tasks as a single, integrated process.

20 Claims, 9 Drawing Sheets

(51) Int. Cl.
  *G10L 15/16* (2006.01)
  *G10L 15/22* (2006.01)

(56) References Cited

U.S. PATENT DOCUMENTS

| | | | |
|---|---|---|---|
| 11,468,242 B1* | 10/2022 | Coppersmith | G06F 40/216 |
| 11,558,509 B1* | 1/2023 | Jayapalan | H04M 3/5237 |
| 11,620,311 B1* | 4/2023 | Kumar | G06F 16/283 |
| | | | 707/602 |
| 11,743,378 B1* | 8/2023 | Johnston | H04M 3/5315 |
| | | | 704/270.1 |
| 12,124,811 B2 | 10/2024 | Carbajales et al. | |
| 2013/0246049 A1* | 9/2013 | Mirhaji | G06F 40/284 |
| | | | 704/9 |
| 2018/0075847 A1 | 3/2018 | Lee et al. | |
| 2018/0137856 A1 | 5/2018 | Gilbert | |
| 2018/0197104 A1* | 7/2018 | Marin | G06N 5/022 |
| 2019/0012198 A1 | 1/2019 | Ni et al. | |
| 2020/0151219 A1 | 5/2020 | Anand et al. | |
| 2021/0073474 A1* | 3/2021 | Sengupta | G06F 40/247 |
| 2021/0097140 A1* | 4/2021 | Chatterjee | G06N 5/022 |
| 2021/0319066 A1* | 10/2021 | Boxwell | G06F 40/131 |
| 2022/0164683 A1* | 5/2022 | Hao | G06F 16/35 |
| 2023/0061906 A1* | 3/2023 | Gaur | G06F 16/243 |
| 2023/0306205 A1* | 9/2023 | Maeder | G06F 16/3344 |
| 2024/0194194 A1 | 6/2024 | Venkateswaran et al. | |

OTHER PUBLICATIONS

Fischer, M.H et al., "DIY assistant: a multi-modal end-user programmable virtual assistant," In Proceedings of the 42nd ACM SIGPLAN International Conference on Programming Language Design and Implementation, Jun. 19, 2021, pp. 312-327.

Y. Rizk et al., "A Unified Conversational Assistant Framework for Business Process Automation," arXiv Preprint, arXiv:2001.03543v1, Jan. 7, 2020, 9 pg.

Cewe, C. et al., "Minimal effort requirements engineering for robotic process automation with test driven development and screen recording," In Business Process Management Workshops: BPM 2017 International Workshops, Barcelona, Spain, Sep. 10-11, 2017, Revised Papers 15, pp. 642-648, Springer International Publishing, [Abstract].

Cormode, G. et al., "Forward decay: A practical time decay model for streaming systems," In 2009 IEEE 25th International Conference on Data Engineering, Mar. 29, 2009, pp. 138-149, IEEE.

Huo, S. et al., "Natural Language Sentence Generation from API Specifications," arXiv preprint, arXiv:2206.06868. Jun. 1, 2022, 9 pg.

Li, T.J. et al., "Pumice: A multi-modal agent that learns concepts and conditionals from natural language and demonstrations," In Proceedings of the 32nd annual ACM Symposium on User Interface Software and Technology, Oct. 17, 2019, pp. 577-589.

Mell, P. et al., The NIST Definition of Cloud Computing, National Institute of Standards and Technology, U.S. Dept. of Commerce, Special Publication 800-145, Sep. 2011, 7 pg.

Pertsch et al., "Demonstration guided Reinforcement Learning with learned skills", arXiv, Jul. 21, 2021, 18 pages, doi: https://doi.org/10.48550/arXiv.2107.10253.

* cited by examiner

AUTOMATED COMPOSITE AGENT GENERATION BY IMPLICIT DERIVATION

BACKGROUND

This disclosure relates to the integration of artificial intelligence with robotic process automation.

A digital worker is a type of software robot. The digital worker can perform multiple automated tasks sequentially using artificial intelligence and machine learning. The digital worker can work independently of, or in conjunction with, a human user in performing automated tasks. The digital worker, endowed with AI, can ask questions when it needs more information. The digital worker can learn by doing. The digital worker can deal with so-called "exceptions to the rule" in performing automated tasks. The digital worker is distinct from a digital agent. A digital agent is endowed with a specific skill and provides task-specific automation. For example, a calendar agent may be capable of performing one or more calendar-related tasks but is not capable of performing other tasks (e.g., retrieving current stock market data). A typical digital worker comprises multiple digital agents for performing a variety of tasks.

SUMMARY

In one or more embodiments, a method includes generating an agent cooperation graph (ACG) based on machine-human interactions between a user and digital agents pretrained to perform automated tasks. The ACG comprises nodes representing the digital agents connected by edges weighted according to cooperation densities between two or more edge-connected digital agents. The method includes generating a composite sub-graph (CSG) of the ACG. The CSG comprises nodes representing cooperating digital agents. The cooperating digital agents are a subset of the digital agents and are identified by cooperation densities that exceed a predetermined threshold in cooperatively performing related automated tasks in response to multiple requests of the user. The method includes generating a composite agent configured to perform a composite process in response to a composite instruction of the user. Generating the composite agent includes generating a composite evaluator based on the multiple requests to the cooperating digital agents and compiling the related automated processes to generate a composite actuator of the composite agent to implement the related automated tasks as a single, integrated process.

In one or more embodiments, a system includes one or more processors configured to initiate executable operations. The operations include generating an ACG based on machine-human interactions between a user and digital agents pretrained to perform automated tasks. The ACG comprises nodes representing the digital agents connected by edges weighted according to cooperation densities between two or more edge-connected digital agents. The operations include generating a CSG of the ACG. The CSG comprises nodes representing cooperating digital agents. The cooperating digital agents are a subset of the digital agents and are identified by cooperation densities that exceed a predetermined threshold in cooperatively performing related automated tasks in response to multiple requests of the user. The operations include generating a composite agent configured to perform a composite process in response to a composite instruction of the user. Generating the composite agent includes generating a composite evaluator based on the multiple requests to the cooperating digital agents and compiling the related automated processes to generate a composite actuator of the composite agent configured to implement the related automated tasks as a single, integrated process.

In one or more embodiments, a computer program product includes one or more computer-readable storage media and program instructions collectively stored on the one or more computer-readable storage media. The program instructions are executable by a processor to cause the processor to initiate operations. The operations include generating an ACG based on machine-human interactions between a user and digital agents pretrained to perform automated tasks. The ACG comprises nodes representing the digital agents connected by edges weighted according to cooperation densities between two or more edge-connected digital agents. The operations include generating a CSG of the ACG. The CSG comprises nodes representing cooperating digital agents. The cooperating digital agents are a subset of the digital agents and are identified by cooperation densities that exceed a predetermined threshold in cooperatively performing related automated tasks in response to multiple requests of the user. The operations include generating a composite agent configured to perform a composite process in response to a composite instruction of the user. Generating the composite agent includes generating a composite evaluator based on the multiple requests to the cooperating digital agents and compiling the related automated processes to generate a composite actuator of the composite agent configured to implement the related automated tasks as a single, integrated process.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
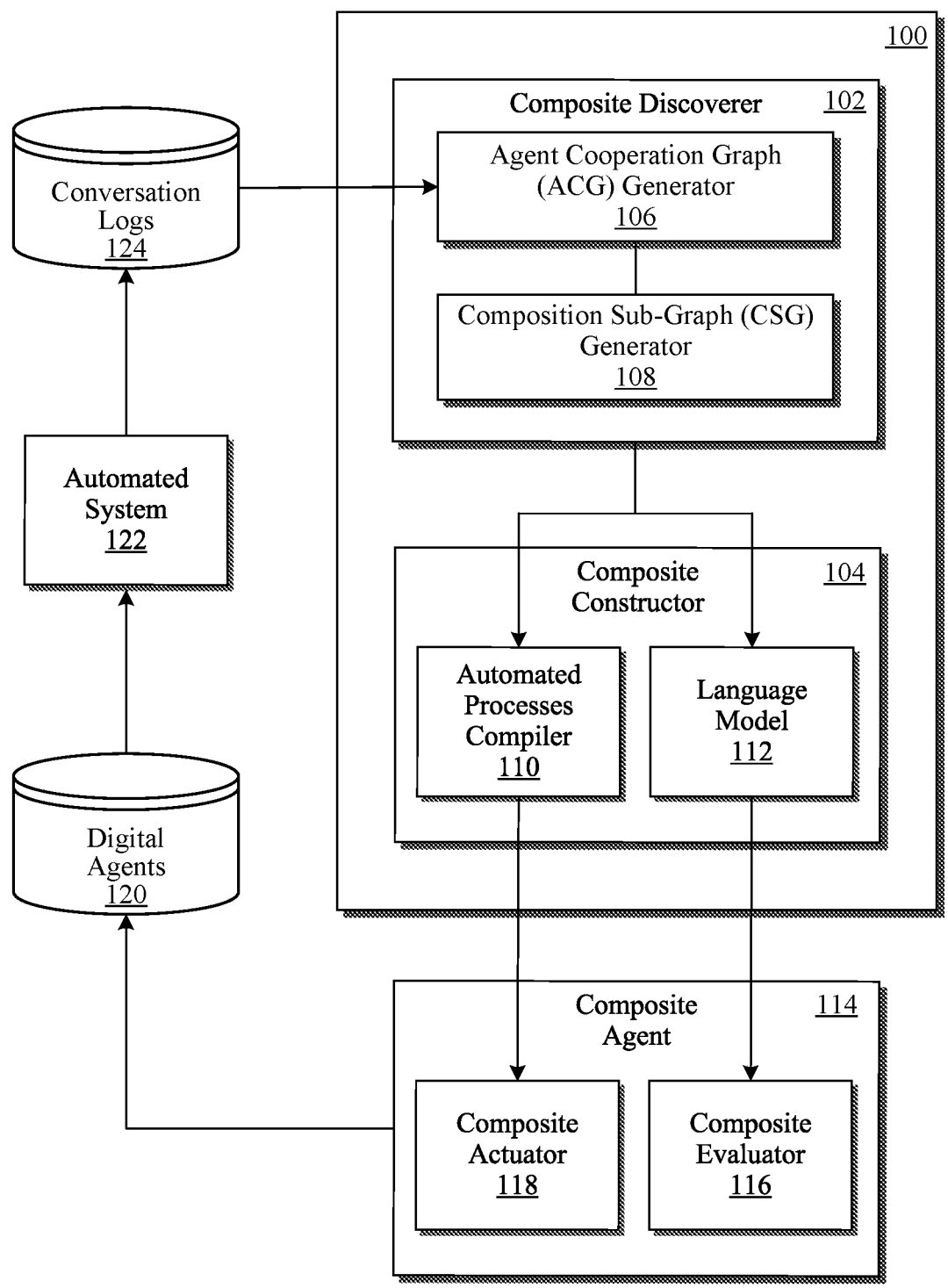
FIG. 1 illustrates an example architecture of an automated composite agent generator (ACAG) framework.

While the disclosure concludes with claims defining novel features, it is believed that the various features described within this disclosure will be better understood from consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to the integration of artificial intelligence with robotic process automation. A digital worker is capable of performing a wide variety of tasks. In performing certain tasks, the digital worker performs the tasks at the direction of a user. The digital worker relieves the user of the burden of having to perform the tasks but relies on specific instructions from the user. Typically, the user provides instruction in machine-human interactions. For example, in arranging a trip, the user can instruct one digital agent to book a return flight to a designated destination, another digital agent to arrange transportation to and from the airports, and still another digital agent to reserve a hotel room at the destination. Although a language model can detect in the user's natural language instructions the specific digital agents that are capable of performing relevant work, the need to engage in the same sequence of interactions can be tedious and time consuming. Every time the user wants to arrange a trip, the user must engage in the same sequence of interactions with each of the task-specific digital agents.

In accordance with the inventive arrangements disclosed herein, methods, systems, and computer program products are provided that are capable of generating an agent cooperation graph (ACG) based on machine-human interactions between a user and digital agents pretrained to perform automated tasks. The ACG comprises nodes representing the digital agents connected by edges weighted according to cooperation densities between two or more edge-connected digital agents. A composite sub-graph (CSG) of the ACG is generated, the CSG comprising nodes representing cooperating digital agents. The cooperating digital agents form a subset of the digital agents identified by cooperation densities that exceed a predetermined threshold in cooperatively performing related automated tasks in response to multiple requests of the user. Based on the CSG, the inventive arrangements generate a composite agent configured to perform a composite process in response to a composite instruction of the user. Generating the composite agent includes generating a composite evaluator based on the multiple requests to the cooperating digital agents and compiling the related automated processes to generate a composite actuator of the composite agent configured to implement the related automated tasks as a single, integrated process.

One aspect of the inventive arrangements is generating the composite agent by implicit derivation. The creation is totally transparent. The user need not even be aware of the creation of the composite agent. The inventive arrangements, without direct user involvement, observe the cooperation among different digital agents in performing automated tasks for the user, and based on the observation, discover an overall objective of the user. The inventive arrangements automatically translate the discovery into a composite agent capable of performing all the tasks of the different digital agents as a single, integrated process without the necessity of issuing multiple requests or instructions to each individual digital agent. By contrast, conventional automated systems typically rely on robotic process automation requiring the recording and electronic storing of multiple commands at the explicit behest of the user. These conventional automated systems usually require a click or other user action to invoke the recorded commands necessary to initiate distinct automated processes. The composite agent created by the inventive arrangements differs, for example, in being capable of performing all the different tasks to meet the user's overall objective without multiple machine-user interactions.

Rather than engage in a protracted series of user requests and digital agent responses, a user may issue a composite command to invoke action of the composite agent. For example, in arranging flights, ground transportation to and from airports, and reserving a hotel suite, a user interacting with an automated system may simply say "I want to arrange a trip" to a specific destination on specific dates. The composite agent, having been transparently created by the inventive arrangements from the user's prior actions, automatically performs a composite process that encompasses all the different tasks previously performed by multiple digital agents, each acting separately with the user.

Not only is the user relieved of the burden of engaging in a sequence of machine-human interactions, but the composite process is performed more efficiently and imposes less demand on the processing resources of the underlying hardware. The number of different interactions, now reduced to one or only a few (collectively a composite instruction, request, or command), obviates the need for extensive use of text and/or speech communications via a natural language interface with multiple digital agents. The burden is lessened as to time as well as to usage of processing resources, given that there is not a protracted series of text or voice exchanges between the user and multiple digital agents.

The graph structures provide an efficient mechanism for determining which of multiple digital agents may be identified as cooperating significantly with one another in performing related tasks. Generating the CSG, in certain embodiments, includes determining cooperation distance metrics between edge-connected nodes. The cooperation distance metrics are derived from the cooperation densities. As generated, the CSG includes only edge-connected nodes whose cooperation distance between an edge-connected node and at least one node connected thereto is less than a predetermined threshold. This makes more efficient the generating of the composite agent, given that non-cooperating digital agents need not be considered in performing the processes necessary for generating the composite agent.

A user's circumstances may change over time, and accordingly, the user's interactions with an automated digital system may change as well, which likely also changes the cooperation densities of the digital agents invoked by the user. In some arrangements, the inventive arrangements update the ACG and CSG in response to detecting changes in cooperation densities between two or more digital agents. Given that more recent patterns of interaction and cooperation are more likely significant, the inventive arrangements in some embodiments utilize an edge weight decay function to update the ACG and CSG.

In another aspect, user utterances may be extracted from a machine-human interaction between the user and the digital agents identified as cooperating. A text may be generated by concatenating user utterances extracted from the machine-human interaction. Inputting the text to the language model, a semantic description of the related automated processes may be generated. The summary semantic description may be used to generate the composite evaluator.

Each digital agent is a software construct that includes a semantic description of the automated task performed by the digital agent. By extracting a semantic description of each of the group of related automated tasks, the inventive arrangements are able also to generate a composite evaluator. The inventive arrangements may create a composite evaluator based on the semantic descriptions. The composite evaluator may be incorporated in the composite agent to enable the composite agent to invoke the composite process in response to the composite instruction of the user.

Thus, in certain embodiments, user utterances are collected from logs of user-digital agent interactions that invoked process execution of one or more digital agents and concatenated. The concatenated user utterances are input to a language model to generate the semantic description of the related automated process. Alternatively, in other embodiments, semantic descriptions of a group digital agents that perform related automated tasks are extracted from the digital agents and used generate the composite evaluator. In still other embodiments, the inventive arrangements may generate the composite evaluator from both the concatenation of user utterances and semantic descriptions extracted from cooperating digital agents.

In another aspect, the composite agent may be generated by a sequence of actions performed by the inventive arrangements. In a first traversal, an agent flow graph is created from the CSG beginning at a root node. In a second traversal, each node of the agent control flow graph is replaced with a specification of an automated task performed by the digital agent represented by the node. Executable code for performing the composite process is generated based on the specification of each automated task.

In another aspect, the inventive arrangements may create one or more candidate composite agents. A candidate composite agent is one that has been generated by the inventive arrangements but not yet added to a collection of active digital agents. A composite candidate monitor may assess promotion opportunities for the one or more candidates, retro-actively, by comparing the automated processes currently executed by digital agents in response to user input with the capabilities captured by a candidate composite agent. If a recent user-driven digital agent executes a sequence of automated processes that matches capabilities of the candidate composite agent, then composite candidate monitor detects an opportunity to promote the candidate composite agent and invites the user to add the candidate composite agent to the collection of active digital agents.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example architecture for automated composite agent generation (ACAG) framework 100. ACAG framework 100 may comprise software which is executable on a computer such as computer 801 operating in computing environment 800, as described in reference to FIG. 8. In the example of FIG. 1, ACAG framework 100 illustratively includes composite discoverer 102 and composite constructor 104. In certain embodiments, composite discoverer 102 includes agent cooperation graph (ACG) generator 106 and composition sub-graph (CSG) generator 108. Composite constructor 104, in certain embodiments, includes automated processes compiler 110 and language model 112. Language model 112, in certain embodiments, is a generative language model. In certain embodiments, language model 112 is a large language model trained on content comprising any one of various different languages, including for example, the code of any one of various programming languages.

Figure 2:
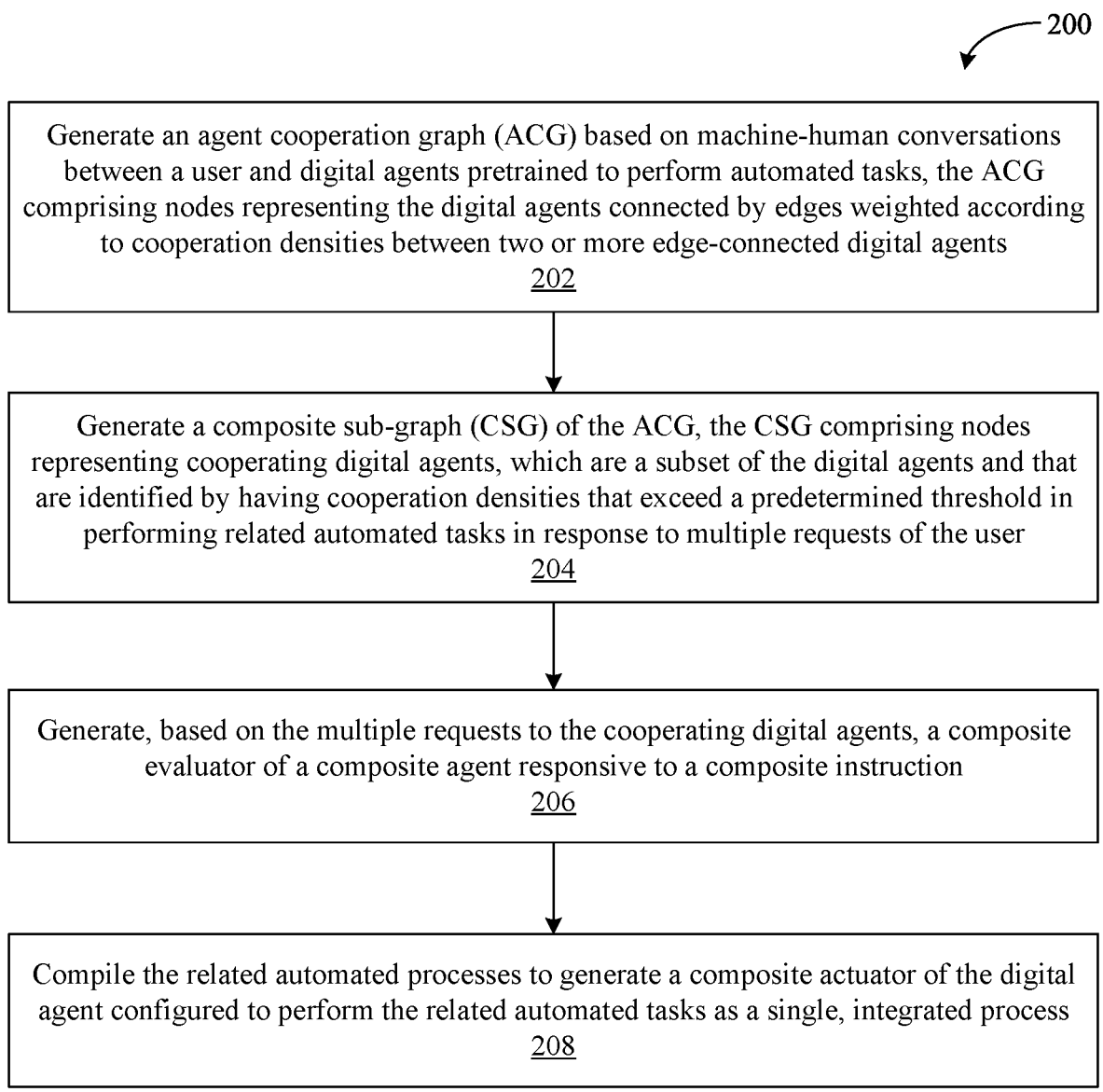
FIG. 2 illustrates an example method of operation of the ACAG framework illustrated in FIG. 1.

FIG. 2 illustrates an example method 200 of operation of the ACAG framework 100 of FIG. 1. Method 200 may be performed by ACAG framework 100 without direct user involvement. Indeed, ACAG framework 100 is capable of performing method 200 transparently, without the user's awareness. Operatively, as implemented by ACAG framework 100, method 200 generates composite agent 114. Illustratively, composite agent 114 includes composite evaluator 116 and composite actuator 118. Once created, composite agent 114 may be added to digital agents 120, electronically stored for subsequent use in automated system 122. Digital agents 120 are software robots that are pre-trained to perform distinct automated tasks in response to a user's natural language inputs (speech or text), such as requests or instructions via a natural language interface, to automated system 122.

Referring to FIGS. 1 and 2 collectively, in block 202, ACG generator 106 of composite discoverer 102 generates an ACG whose nodes represent digital agents 120. The ACG is generated from machine-human interactions collected in logs 124. Logs 124 are execution logs that record and electronically store execution events by a digital worker comprising multiple digital agents that each perform specific tasks when invoked. In various arrangements, logs 124 may include timestamps that indicate the order of the executions, natural language input (spoken or written user instructions), identifiers that indicate the one or more digital agents invoked by the digital worker in response to the natural language input, interactions between the digital agent(s) and user, and/or other execution event data. For example, a digital agent may generate and pose questions to the user, such as a flight booking agent's asking the user, "when to you wish to depart?"

During a machine-human interaction, a user inputs a speech-based or text-based natural language instruction or request to automated system 122. One or more of digital agents 120 respond to a user instruction by performing an automated task. In an interactive session between the user and automated system 122, the user may make multiple requests to digital agents 120 to achieve a common objective. For example, the intent of the user in inputting a sequence of requests that include booking a flight, requesting a hotel reservation, and renting a car, is to arrange a trip. Despite the single, unified objective of the user, the user must input a sequence of requests that are each handled by a different digital agent.

Nonetheless, especially given the relatedness of the automated tasks, digital agents 120 may cooperate in meeting the different but related user requests. The ACG generated by ACG generator 106 captures the effect by connecting digital agents, detecting cooperation densities between the digital agents, and weighting edges connecting the digital agents by assigning weights determined based on the cooperation densities. Different metrics for measuring cooperation densities are described in greater detail below.

The ACG generated by ACG generator 106 from machine-human interactions collected in logs 124 is a heterogeneous graph whose edges may have multiple properties. For example, edges may be bi-directional and may change with the type of interaction between nodes. With the collection of additional machine-human interactions in logs 124, a new node representing a newly created digital agent may be folded into the ACG for immediate re-use. The ACG comprises edge-connected nodes representing digital agents linked according to interactions between various combinations of the digital nodes, in contrast to a conventional process graph. Whereas a conventional process graph handles sequencing and control flow activities, the ACG is configured to represent data sharing and automated process relationships represented by properties of the edges.

In block 204, CSG generator 108 generates a CSG, a sub-graph of ACG determined based on the cooperation densities. The nodes of the CSG represent cooperating digital agents. The cooperating digital agents comprise a subset of digital agents 120. Each cooperating digital agent is edge-connected with at least one other digital agent with which the cooperation density exceeds a predetermined threshold.

Figure 3A:
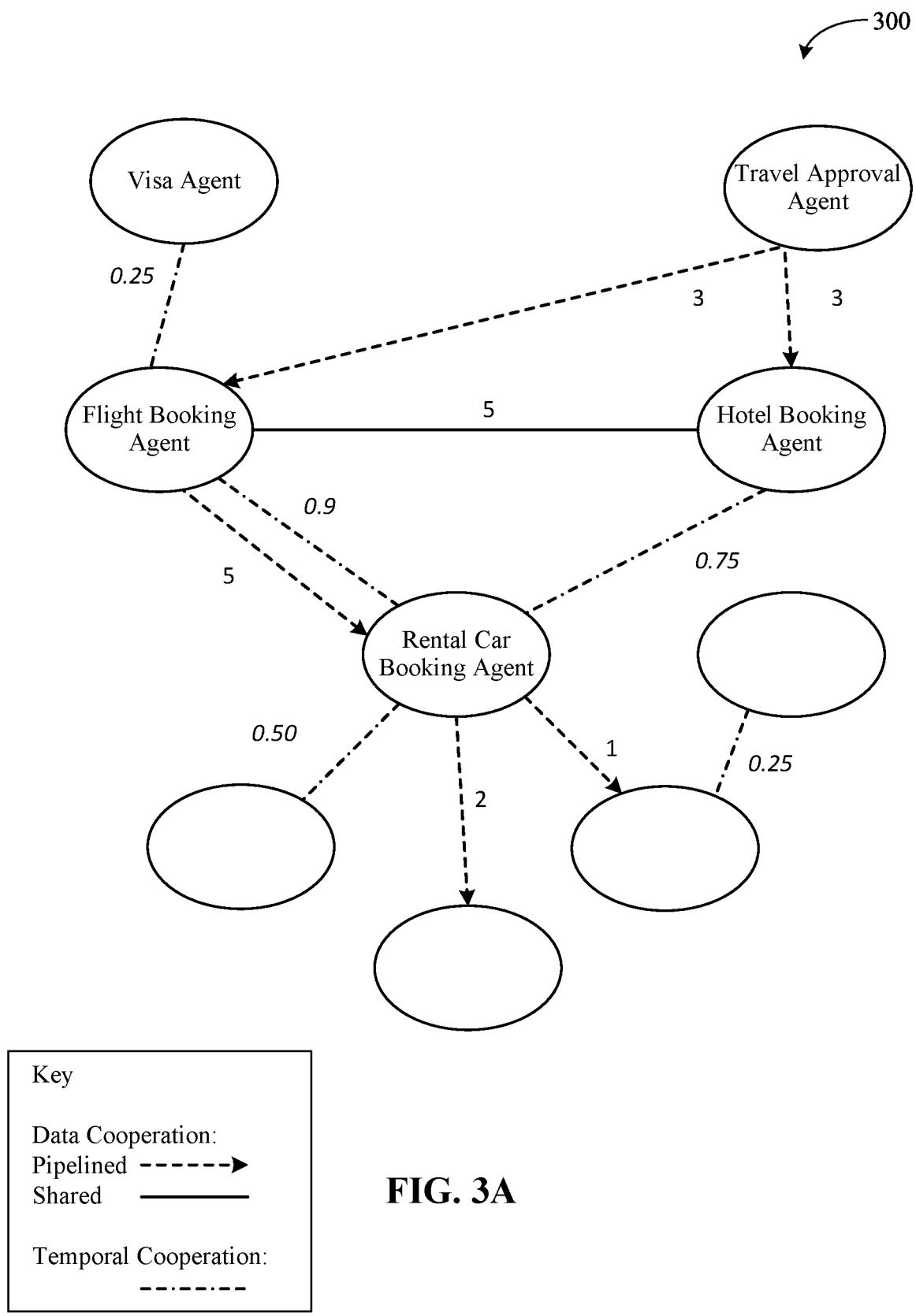
FIGS. 3A and 3B illustrate both an example agent cooperation graph and a cooperation sub-graph derived from the agent cooperation graph.
Figure 3B:
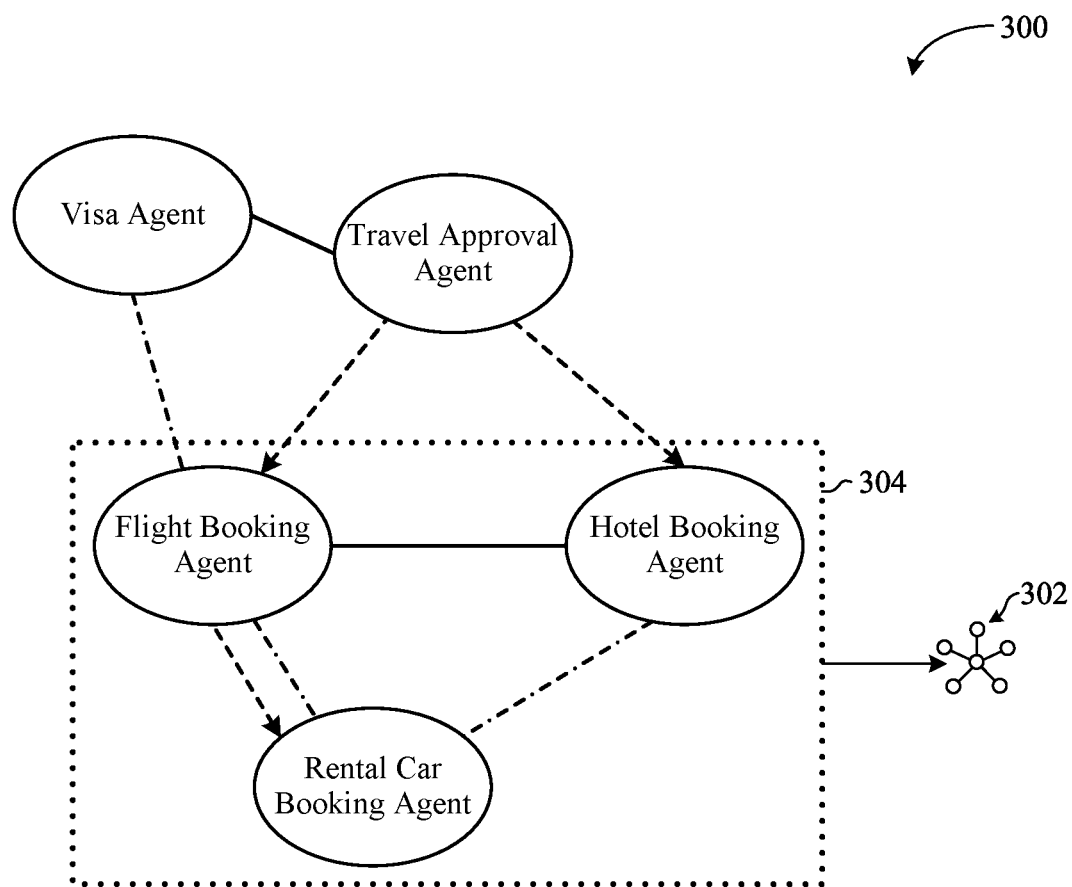

Referring additionally to FIGS. 3A and 3B, example ACG 300 and example CSG 302 extracted therefrom are generated respectively by ACG generator 106 and CSG generator 108 in the example context of a user intending to travel to London from Boston. Using automated system 122, for example, the user may input text or speech via a natural language interface requesting that a flight booking digital agent book a flight from Logan Airport to Heathrow and a return flight three days later. Via the same natural language interface with automated system 122, the user may request that a rental car booking digital agent to reserve a car for traveling to and from the airports on the respective dates. Additionally, the user may request that a hotel booking digital agent reserve a room for three days in a London hotel. The user's overall intent is a round trip three-day visit to London. Each of the cooperating digital agents performs a distinct automated process, but jointly, the automated processes are cooperative in the sense that each serves the user's overall objective of travel to London and back.

The nodes of ACG 300 are labeled by ACG generator 106 to indicate the specific digital agents corresponding to the labeled nodes that, at least to some degree, cooperate in responding to the user's trip-related requests. An edge connects two or more of the nodes of ACG 300 if the nodes cooperate. The intensity or degree to which different digital agents cooperate is quantified by cooperation densities determined by ACAG framework 100. The cooperation densities are automatically machine-determined by ACAG framework 100 based on quantitative metrics determined from the user's interactions with automated system 122. Different metrics, in various arrangements, may be used to determine cooperation densities. In certain embodiments, a measure of cooperation density may be determined from data cooperation and/or temporal cooperation between two or more digital agents. Illustratively, in FIGS. 3A and 3B, data cooperation and temporal cooperation are distinguished by different shadings of the edges.

Data cooperation is concurrent if during a machine-human interaction with the user, two digital agents perform different automated processes using the same data input. The data input may be from a third digital agent or from the user whether via the natural language interface or another user interface. Data cooperation is pipelined if during the same machine-human interaction, one digital agent's output serves as the input to another digital input. The greater the concurrent or pipelined data cooperation, the greater the cooperation density between two digital agents. Illustratively, in FIGS. 3A and 3B, pipelined data cooperation is distinguished from concurrent data cooperation by an arrow extending from the digital agent that transmits data to the digital agent that receives the data.

Temporal cooperation as a measure of cooperation density between two digital agents can be measured by conversation distance, that is the number of turns separating two digital agents. During a machine-human interaction, a turn is an input-response sequence (e.g., a user request and a digital agent response is one turn). The fewer turns between separate invocations of two digital agents during the machine-human interaction, the closer the conversation distance between the digital agents. Data and temporal cooperation can be quantitatively measured in various ways, including normalized percentages. For example, if conversation distance is measured as a percentage, the closer the value is to one, the closer the distance (and thus the greater cooperating distance) between two digital agents. A greater integer value on a relative scale, for example, may indicate greater temporal cooperation (and hence greater cooperation density) between two digital agents. Temporal cooperation, for example, may be quantified by a conversation distance value between one and zero indicating the probability that two digital agents, based on past responses to machine-human interactions, cooperate within a predetermined time interval during a user session with automated system 122. In other arrangements, as illustrated, in FIG. 3A, the temporal cooperation may be defined as the average conversation distance between two digital agents within a predetermined time window. In various arrangements, a larger value indicates a larger conversation distance.

Operatively, as shown in FIG. 3B, CSG generator 108 traverses ACG 300 and identifies a subset of digital agents, identifying the digital agents specifically as cooperating digital agents 304. Cooperating digital agents 304 are the flight booking agent, hotel booking agent, and rental car booking agent, each labeled by ACG generator 106 accordingly. CSG generator 108 generates CSG 302, whose nodes comprise only cooperating digital agents 304. In various embodiments, CSG generator 108 identifies tightly clustered nodes in generating a CSG from a corresponding ACG. In some embodiments, for example, CSG generator 108 implements a clustering algorithm (e.g., K-means) in identifying tightly clustered subgraphs of the ACG. In other embodiments, CSG generator 108 implements a greedy algorithm that starts with a seed node and progressively adds nodes that are within a threshold cooperation distance, t.

In certain embodiments, CSG generator 108 identifies the cooperating nodes by determining cooperation distance metrics between edge-connected nodes. The cooperation distance metrics are derived from the cooperation densities. Various distance metrics can be implemented by composite discoverer 102. In some embodiments, each distance metric between edge-connected nodes is computed by composite discoverer 102 as a function of the data weights, $W(e_{data}(n_i, n_j))$, and of the temporal weights, $W(e_{temporal}(n_i, n_j))$, assigned to each edge $e(n_i, n_j)$ connecting the i-th node with the j-th node. The distance may be computed as $$\frac{1}{\alpha * W(e_{temporal}(n_i, n_j)) + (1-\alpha) * W(e_{data}(n_i, n_j))}$$

where α is a coefficient that quantifies the relative importance of the temporal and data weights.

Having implicitly discovered cooperating agents during a first phase, composite constructor 104 during a second phase constructs composite agent 114. As constructed, composite agent 114 is configured to perform a composite process in response to a composite instruction of the user. The composite process executes all the automated tasks that were performed by digital agents 120 identified as cooperating digital agents, but performs the tasks as a single, integrated process.

Referring still to FIGS. 1 and 2, in block 206, composite constructor 104 generates composite evaluator 116 as part of composite agent 114. Composite evaluator 116 is a summary semantic description of what the overall objective or higher-level intent of the user is when invoking the digital agents that cooperatively perform related tasks. The summary semantic description describes what it is that the user wants the digital agents to do cooperatively (e.g., make all necessary travel arrangements to a user-designated destination). Composite constructor 104, in certain embodiments, implements language model 112 for generating composite evaluator 116. Language model 112 may be a transformer-based generative language model or other large language model. Using language model 112, composite constructor 104 generates composite evaluator 116 based on user utterances extracted from the user's machine-human interaction with automated system 122 and input to language model 112.

Operatively, automated system 122 receives user input (e.g., natural language text or voice input) and applies the input to the composite agent 114's respective components, composite evaluator 116 and composite actuator 118 to invoke an appropriate composite process. Composite evaluator 116 enables the user to invoke the composite process by uttering a composite instruction (a few words such as "I want to book a trip to London") via a natural language interface with composite agent 114.

Additionally, each of digital agents 120 is a software construct comprising a specification from which a semantic description can be extracted describing the automated process that the digital agent performs. Language model 112 can predict what the user intends to accomplish based on the semantic descriptions of the automated tasks invoked by the user during the user's machine-human interaction with automated system 122.

In certain embodiments, composite constructor 104 generates composite evaluator 116 by concatenating user utterances collected from logs 124 of machine-human interactions of user-digital agent interactions and inputs the concatenated user utterances into language model 112 to generate composite evaluator 116. In other embodiments, semantic descriptions of digital agents that perform related automated tasks are extracted from the digital agents and used by composite constructor 104 to generate composite evaluator 116. In still other embodiments, composite constructor 104 may generate composite evaluator 116 from both the input of a concatenation of user utterances to language model 112 and semantic descriptions extracted from cooperating digital agents.

In block 208, composite constructor 104 generates composite actuator 118 of composite agent 114. In certain embodiments, composite constructor 104 utilizes automated processes compiler 110 which compiles the automated processes and generates executable code for performing the composite process, the composite process performing each related automated tasks, albeit as a single, integrated process.

Figure 4:
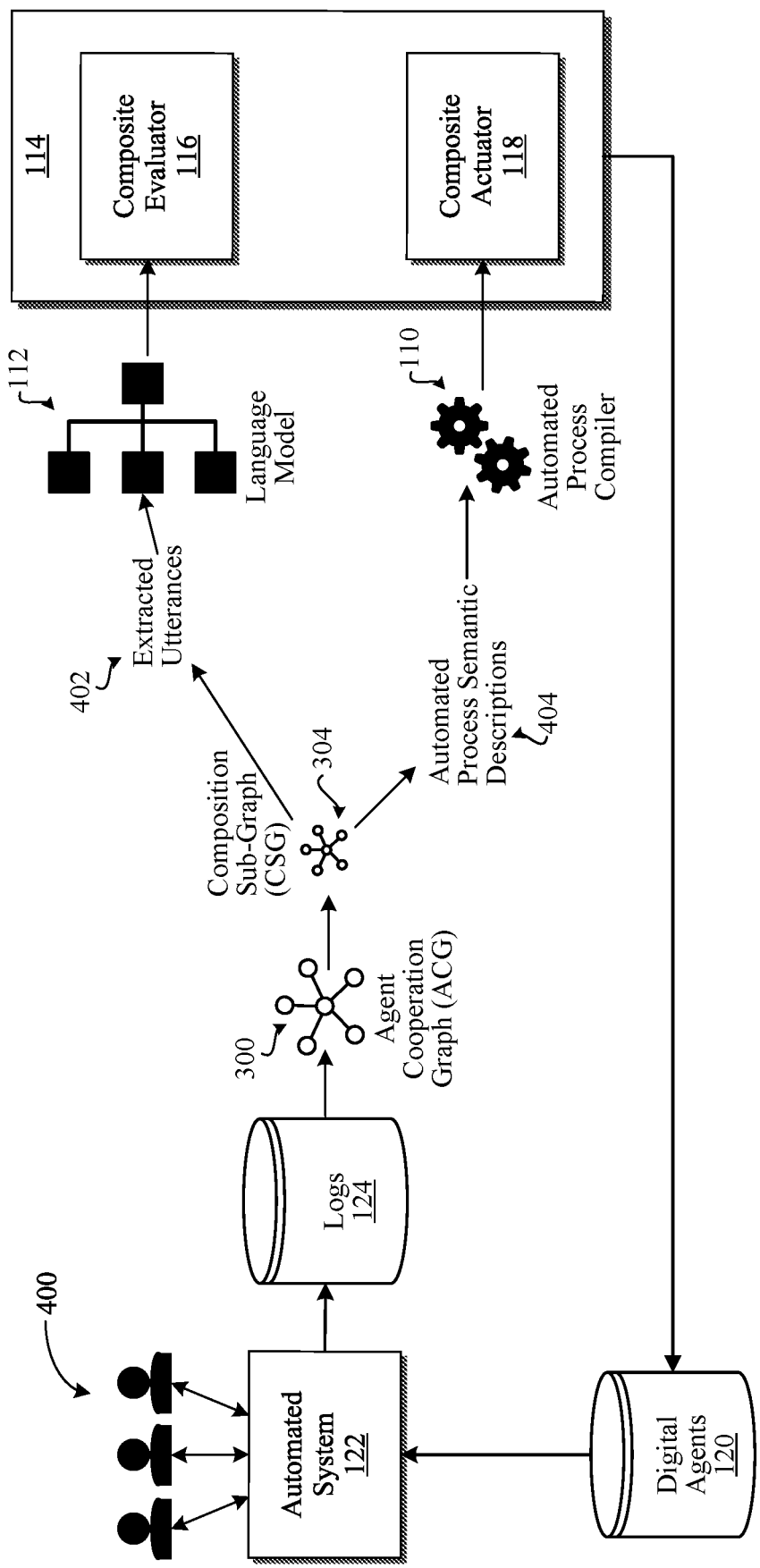
FIG. 4 illustrates schematically certain operative features of the ACAG framework of FIG. 1.

FIG. 4 schematically illustrates certain operative features of ACAG framework 100. Composite agent 114, as generated with ACAG framework 100, comprises composite evaluator 116 and composite actuator 118. Composite evaluator 116 processes a user utterance and, in response thereto, determines whether and to what extent the composite process executable by composite agent 114 corresponds to cooperative automated tasks called for in response to the user utterance. Composite actuator 118 implements the set of automated tasks executed as a composite process by composite agent 114. Composite agent 114, in response to a user utterance, may return a confidence value to automated system 122. The confidence value may indicate the extent to which the composite process performs automated tasks required in response to the user utterance. For example, the confidence value may correspond to the number of requisite cooperative automated tasks performed by composite agent 114 as a composite process. Based on the confidence score, automated system 122 may select composite agent 114 or another of multiple composite agents callable by automated system 122 to execute in response to the user utterance.

In the example illustrated by FIG. 4, logs 124 include machine-human interactions 400 between users and automated system 122 (e.g., an automated digital worker system). The logs include both user utterances (speech or text) instructing or requesting performance of an automated task, the one or more digital agents invoked by the digital worker to process the user utterance, and one or more digital agent responses. Based on machine-human interactions 400, composite discoverer 102 generates ACG 300 in which the nodes correspond to digital agents 120 (not shown) of automated system 122. Based on the cooperation between digital agents performing automated tasks prompted by the machine-human interactions of a specific user, composite discoverer 102 determines and assigns weights to the edges connecting the nodes of ACG 300. The weights correspond to cooperation densities determined by composite discoverer 102 from machine-measured metrics, such as data cooperation and temporal cooperation among different digital agents represented by the node of ACG 300. Traversing ACG 300, composite discoverer 102 generates CSG 302.

Identifying cooperating digital agents from CSG 302, composite constructor 104 extracts user utterances 402 from machine-human interactions between the user and the cooperating digital agents. Extracted user utterances 402 are input to language model 112. Composite constructor 104 extracts semantic specifications of automated processes 404, which are the automated processes that are performed by digital agents identified in CSG 302 as cooperating digital agents, and inputs them to automated processes compiler 110.

Figure 5:
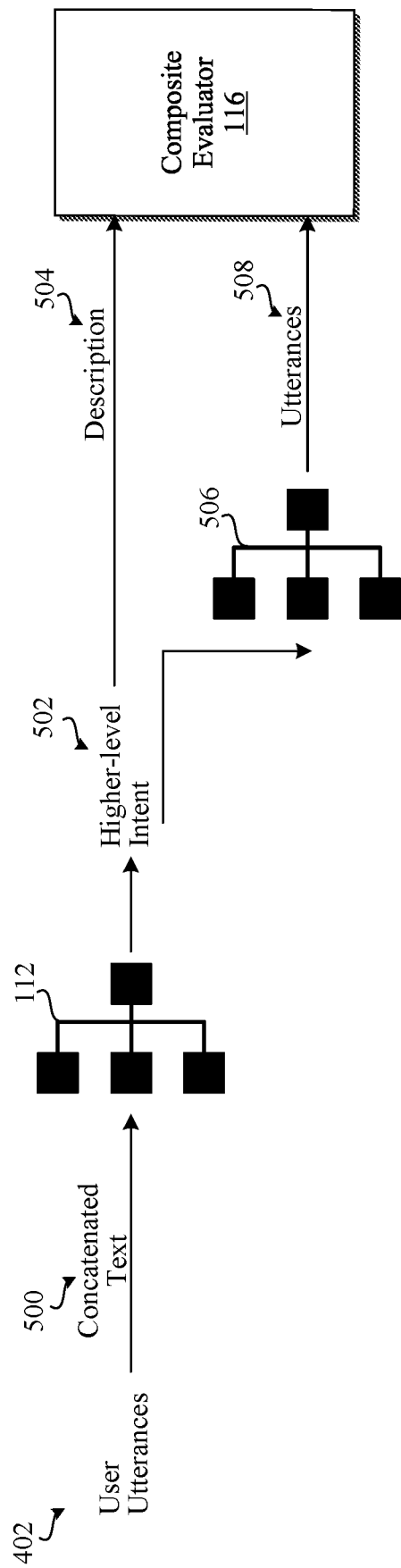
FIG. 5 illustrates schematically certain operative features of the ACAG framework of FIG. 1.

FIG. 5 schematically illustrates certain operative features performed by ACAG framework 100, in accordance with certain embodiments, in generating composite evaluator 116 of composite agent 114. Illustratively, composite constructor 104 generates concatenated text 500 by concatenating user utterances 402. Concatenated text 500 thus includes sequential segments of the machine-human interaction of the user with automated system 122, such as "I want to book a flight," "I need car transportation to and from the airport," and "I need to reserve a hotel room." Language model 112 predicts higher-level intent 502 of the user based on concatenated text 500. For example, that the user intends to arrange for a trip.

From user's higher-level intent 502 composite constructor 104 determines the related automated tasks (e.g., book flight, book car, and book hotel) that are invoked in response to the user utterances 402 during an interactive session of the user with automated system 122. The related tasks, more specifically, may be tasks that are invoked in response to user utterances 402 during an interactive session of the user with automated system 122. The automated tasks that are related are the tasks performed by the digital agents identified as cooperating digital agents. Language model 112 (e.g., transformer-based generative language model) generates summary semantic description 504 of the composite process for implementing the automated processes as a single, integrated process in response to a composite instruction rather than a series of individual requests. Optionally, depending on the type of automated system 122, language model 112 may implement one or more additional pretrained language models 506 to predict utterances 508 (e.g., paraphrases) to enable composite evaluator 116 to recognize and respond accurately to the user. For example, the user may simply paraphrase user intent regarding the trip to London by only saying "I want to go to London for three days" beginning on a certain date. One or more additional pretrained language models 506 can be included as needed to ensure that composite evaluator 116 understands the user's tersely stated intent.

By extracting a semantic description of each of the group of related automated tasks, composite constructor 104 thus creates composite evaluator 116. Composite evaluator enables the automated system 122 to invoke the composite process in response to a composite instruction of the user.

Figure 6:
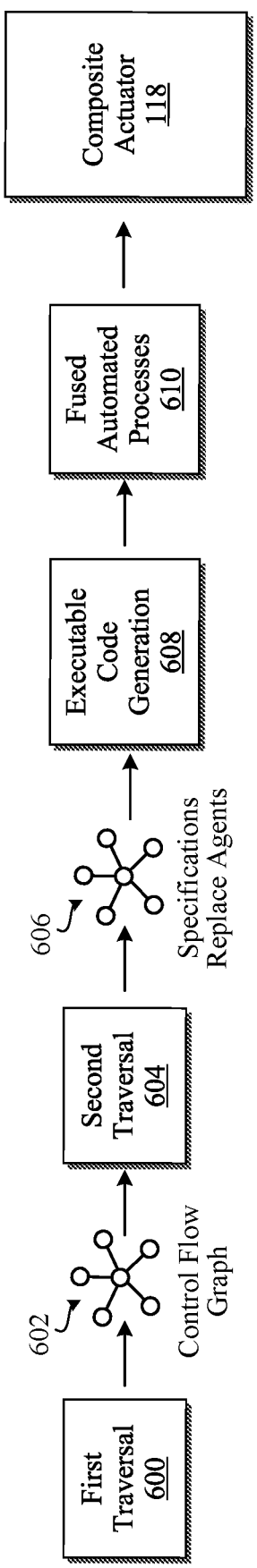
FIG. 6 illustrates schematically certain operative features of the ACAG framework of FIG. 1.

FIG. 6 schematically illustrates certain operative features performed by ACAG framework 100, in accordance with certain embodiments, in generating composite actuator 118 of composite agent 114. Composite constructor 104 illustratively, in first traversal 600, traverses CSG 302 beginning at a root node (not shown) and from CSG 302 generates agent flow graph 602. In second traversal 604, composite constructor 104 traverses agent flow graph 604, generating revised graph 606 by replacing each node in the agent control flow graph with a specification of an automated task performed by the digital agent represented by the corresponding node. Based on the specification of each automated task, composite constructor 104 performs executable code generation 608 to generate executable code of fused automated processes 610 for performing the composite process.

The executable code incorporates the procedures and functions used to implement the individual automated tasks performed by the individual cooperating digital agents. Moreover, the executable code includes whatever procedures and/or functions are needed to coordinate the automated tasks executing a single, integrated process. Thus, the executable code connects digital agents by conveying input data and/or output data from/to digital agents operating cooperatively in accordance with the cooperation indicated by CSG 302. The executable code may be compiled by automated processes compiler 110 into composite agent 114 for execution of the composite process in response to a composite instruction.

Optionally, in some embodiments, composite discoverer 102 updates ACG 300 and CSG 302 in response to detecting changes in cooperation densities between digital agents 120. The changes can occur over time as a user's circumstances change. The change is reflected in the automated tasks that the user requests automated system 122's digital agents to perform and hence the type and extent of cooperation among digital agents 120. The weights of the edges of ACG 300 can be updated accordingly. To emphasize the fact that more recent changes are more likely significant, composite discoverer 102 updates the weights assigned to the edges using an edge weight decay function.

It is often impractical to use a conventional decay function, which typically requires storing data from time zero. Accordingly, in certain embodiments, composite discoverer 102 measures a relative age of ACG 300, with the time parameter T advancing periodically depending on the number of updates and the underlying processes. Using an exponential weighted moving average (EWMA), composite discoverer 102 computes a decayed weight average as a recursion of time t $$EWMA(e, t) = \delta * W(e, t) + (1 - \delta) * EWMA(e, t-1)$$

where W(e,t) is a cooperation distance function. If EWMA(e,t) is below a predetermined threshold, then composite discoverer 102 optionally eliminates the edge connecting nodes $n_i$ and $n_j$.

Figure 7:
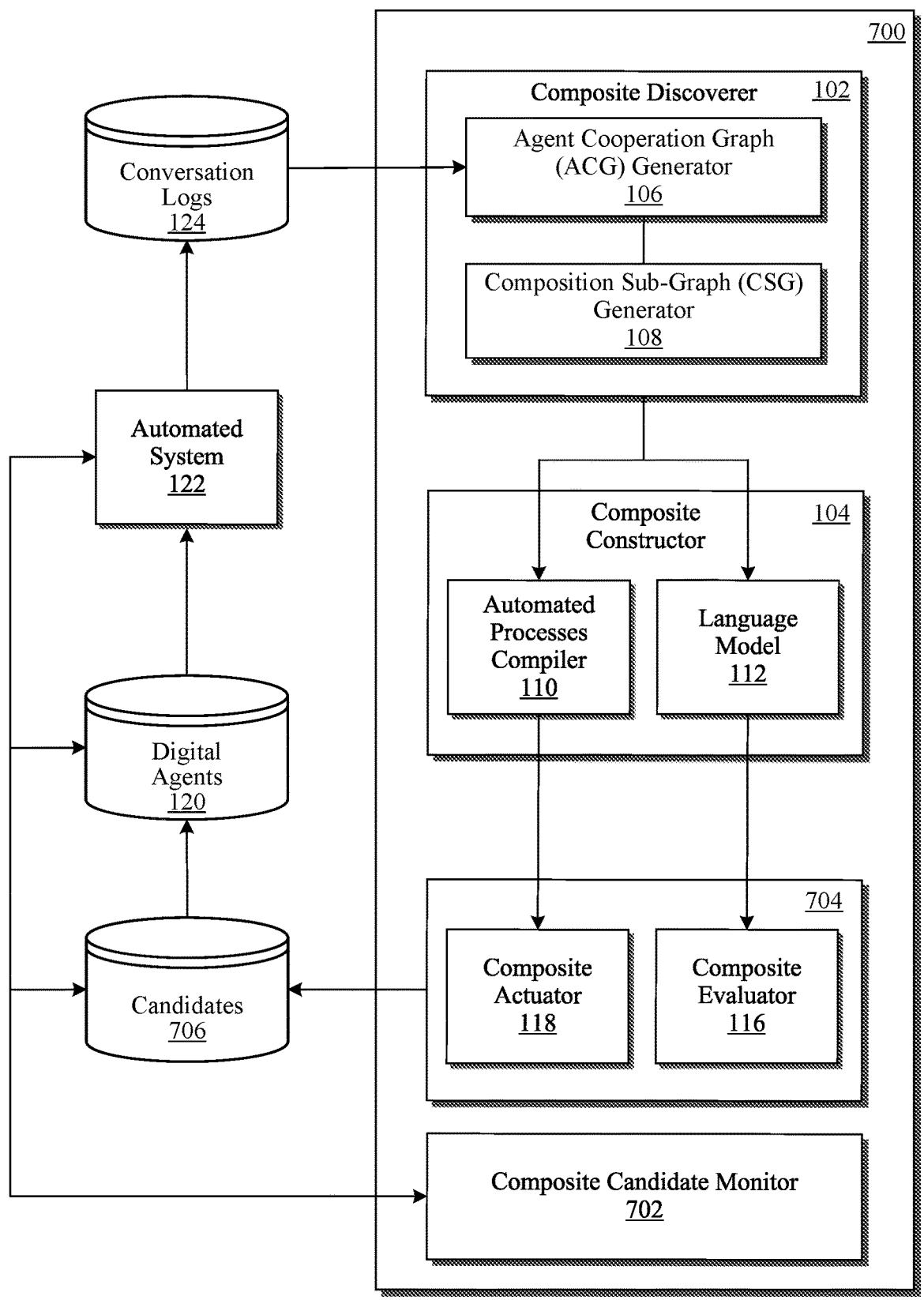
FIG. 7 illustrates another example architecture of an ACAG framework.

FIG. 7 illustrates another example arrangement of the ACAG framework. In the example architecture in FIG. 7, the ACAG framework 700 additionally includes composite candidate monitor 702. The composite pipeline of the example framework transparently (without user input) creates one or more candidate composite agents, illustratively including candidate composite agent 704, which may be added to a pool of candidates 706 waiting to be promoted. A candidate composite agent is one that has been generated by the composite pipeline of ACAG framework 700 but not yet added to the collection of active digital agents, digital agents 120.

Composite candidate monitor 702 assesses promotion opportunities for one or more candidate composite agents retro-actively. Opportunities are assessed by composite candidate monitor 702's comparing automated processes currently executed by digital agents 120 in response to user input with capabilities captured by the candidate composite agents. If a recent user-driven digital agent executes a sequence of automated processes that matches capabilities of candidate composite agent 704, then composite candidate monitor 702 detects an opportunity to promote the candidate by adding it to the collection of active digital agents. Although composite candidate monitor 702 is capable of real-time operation, the opportunities assessment need not be so performed. Composite candidate monitor 702 also, or alternatively, performs background processing. Accordingly, composite candidate monitor 702 can transparently comb through the logs (which include natural language inputs invoking the digital agents) to identify opportunities for promoting candidate composite agent 704.

In one or more examples, composite candidate monitor 702 may include human-in-the-loop feedback. User feedback is invited when composite candidate monitor 702 alerts a user that a candidate is available. Composite candidate monitor 702 enables the user to tune the candidate by examining, editing as needed, and ultimately approving the candidate composite agent 704. Upon user input validating the candidate, composite candidate monitor 702 promotes candidate composite agent 704 by adding it as a new composite agent to the collection of digital agents of automated system 122.

Various aspects of the present disclosure are described herein by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
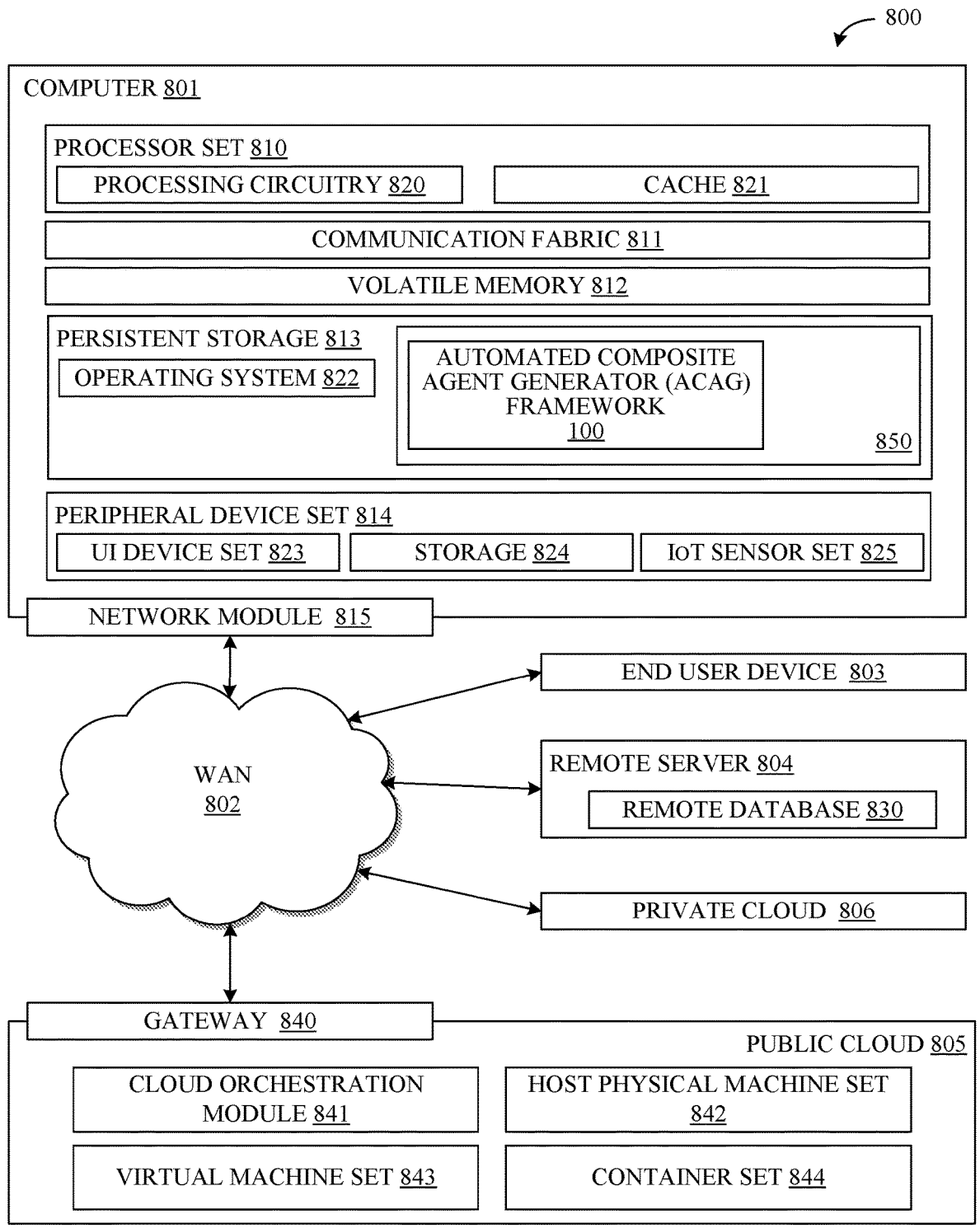
FIG. 8 illustrates an example of a computing environment that is capable of implementing the example ACAG frameworks of FIGS. 1 and 2.

Referring to FIG. 8, computing environment 800 contains an example of an environment for the execution of at least some of the computer code in block 850 involved in performing the inventive methods, such as ACAG framework 100 implemented as executable program code or instructions. ACAG framework 100 generates a composite agent based on a composite intent of a user. The composite agent performs a composite process duplicating the result achieved by multiple interactions of the user with multiple digital agents.

Computing environment 800 additionally includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and framework ACAG 100, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Computer 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

Processor set 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 850 in persistent storage 813.

Communication fabric 811 perstora is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

Persistent storage 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid-state storage devices. Operating system 822 may take several forms, such as various known proprietary operating systems or open-source Portable Operating System Interface type operating systems that employ a kernel. The code included in block 850 typically includes at least some of the computer code involved in performing the inventive methods.

Peripheral device set 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (e.g., where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

Network module 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (e.g., embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (e.g., the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 803 is any computer system that is used and controlled by an end user (e.g., a customer of an enterprise that operates computer 801) and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

Remote server 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

Public cloud 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (e.g., private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The terminology used herein is for the purpose of describing particular embodiments only and is not intended to be limiting. Notwithstanding, several definitions that apply throughout this document will now be presented.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the term "user" refers to a human being.

The terms "first," "second," etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating an agent cooperation graph (ACG) based on machine-human interactions between a user and digital agents pretrained to perform automated tasks, wherein the ACG comprises nodes representing the digital agents connected by edges weighted according to cooperation densities between two or more edge-connected digital agents;
generating a composite sub-graph (CSG) of the ACG, wherein the CSG comprises nodes representing cooperating digital agents, the cooperating digital agents forming a subset of the digital agents identified by cooperation densities that exceed a predetermined threshold in cooperatively performing related automated tasks in response to multiple requests of the user;

updating the ACG and CSG in response to detecting changes in cooperation densities between two or more of the digital agents, wherein the updating the ACG and CSG updates weights assigned to edges of the ACG and CSG using an edge weight decay function; and generating a composite agent configured to perform a composite process in response to a composite instruction of the user, wherein the generating the composite agent includes:
generating a composite evaluator of the composite agent based on the multiple requests to the cooperating digital agents; and
compiling related automated processes to generate a composite actuator of the composite agent configured to implement the related automated tasks as a single, integrated process.

2. The computer-implemented method of claim 1, wherein the generating the CSG includes:
determining cooperation distance metrics between edge-connected nodes, wherein the cooperation distance metrics are derived from the cooperation densities; and
generating the CSG to include only edge-connected nodes whose cooperation distance between an edge-connected node and at least one node connected thereto is less than a predetermined threshold.

3. The computer-implemented method of claim 1, wherein each of the cooperation densities corresponds to at least one of a data cooperation or a temporal cooperation.

4. The computer-implemented method of claim 1, wherein the generating the composite evaluator includes:
extracting user utterances from a machine-human interaction between the user and the cooperating digital agents;
generating a text by concatenating the user utterances extracted from the machine-human interaction; and
determining by a language model a summary sematic description of the related automated processes based on the text for generating the composite evaluator.

5. The computer-implemented method of claim 1, wherein the generating the composite actuator includes:
in a first traversal, generating an agent control flow graph from the CSG beginning at a root node;
in a second traversal, replacing each node in the agent control flow graph with a specification of a related automated task performed by a digital agent represented by the node; and
generating executable code for performing the composite process based on the specification of each related automated task.

6. The computer-implemented method of claim 1, further comprising:
creating a candidate composite agent; and
adding the candidate composite agent to a database of composite agents in response to a user input.

7. A system, comprising:
one or more processors; and
one or more memory devices coupled to the one or more processors, wherein the one or more processors are configured to:
generate an agent cooperation graph (ACG) based on machine-human interactions between a user and digital agents pretrained to perform automated tasks, wherein the ACG comprises nodes representing the digital agents connected by edges weighted according to cooperation densities between two or more edge-connected digital agents;

generate a composite sub-graph (CSG) of the ACG, wherein the CSG comprises nodes representing cooperating digital agents, the cooperating digital agents forming a subset of the digital agents identified by cooperation densities that exceed a predetermined threshold in cooperatively performing related automated tasks in response to multiple requests of the user;

update the ACG and CSG in response to detecting changes in cooperation densities between two or more of the digital agents, wherein the updating the ACG and CSG updates weights assigned to edges of the ACG and CSG using an edge weight decay function; and generate a composite agent configured to perform a composite process in response to a composite instruction of the user, wherein the one or more processors, to generate the composite agent, are configured to:
generate a composite evaluator of the composite agent based on the multiple requests to the cooperating digital agents; and
compile related automated processes to generate a composite actuator of the composite agent configured to implement the related automated tasks as a single, integrated process.

8. The system of claim 7, wherein the one or more processors, to generate the CSG, are configured to:
determining determine cooperation distance metrics between edge-connected nodes, wherein the cooperation distance metrics are derived from the cooperation densities; and
generate the CSG to include only edge-connected nodes whose cooperation distance between an edge-connected node and at least one node connected thereto is less than a predetermined threshold.

9. The system of claim 7, wherein each of the cooperation densities corresponds to at least one of a data cooperation or a temporal cooperation.

10. The system of claim 7, wherein the one or more processors, to generate the composite evaluator, are configured to:
extract user utterances from a machine-human interaction between the user and the cooperating digital agents;
generate a text by concatenating the user utterances extracted from the machine-human interaction; and
determine by a language model a summary sematic description of the related automated processes based on the text for generating the composite evaluator.

11. The system of claim 7, wherein the one or more processors, to generate the composite actuator, are configured to:
in a first traversal, generate an agent control flow graph from the CSG beginning at a root node;
in a second traversal, replace each node in the agent control flow graph with a specification of a related automated task performed by a digital agent represented by the node; and generate executable code for performing the composite process based on the specification of each related automated task.

12. The system of claim 7, wherein the one or more processors are further configured to:
   create a candidate composite agent; and
   add the candidate composite agent to a database of composite agents in response to a user input.

13. A non-transitory computer-readable medium storing a set of instructions for wireless communication, the set of instructions comprising:
   one or more instructions that, when executed by one or more processors of a device, cause the device to:
      generate an agent cooperation graph (ACG) based on machine-human interactions between a user and digital agents pretrained to perform automated tasks, wherein the ACG comprises nodes representing the digital agents connected by edges weighted according to cooperation densities between two or more edge-connected digital agents;
      generate a composite sub-graph (CSG) of the ACG, wherein the CSG comprises nodes representing cooperating digital agents, the cooperating digital agents forming a subset of the digital agents identified by cooperation densities that exceed a predetermined threshold in cooperatively performing related automated tasks in response to multiple requests of the user;
      update the ACG and CSG in response to detecting changes in cooperation densities between two or more of the digital agents, wherein the updating the ACG and CSG updates weights assigned to edges of the ACG and CSG using an edge weight decay function; and
      generate a composite agent configured to perform a composite process in response to a composite instruction of the user, wherein the one or more instructions, to cause the device to generate the composite agent, cause the device to:
         generate a composite evaluator of the composite agent based on the multiple requests to the cooperating digital agents; and
         compile related automated processes to generate a composite actuator of the composite agent configured to implement the related automated tasks as a single, integrated process.

14. The non-transitory computer-readable medium of claim 13,
   wherein the one or more instructions, to cause the device to generate the CSG, cause the device to:
      determine cooperation distance metrics between edge-connected nodes, wherein the cooperation distance metrics are derived from the cooperation densities; and
      generate the CSG to include only edge-connected nodes whose cooperation distance between an edge-connected node and at least one node connected thereto is less than a predetermined threshold.

15. The non-transitory computer-readable medium of claim 13,
   wherein the one or more instructions, to cause the device to generate the composite evaluator, cause the device to:
      extract user utterances from a machine-human interaction between the user and the cooperating digital agents;
      generate a text by concatenating the user utterances extracted from the machine-human interaction; and
      determine by a language model a summary sematic description of the related automated processes based on the text for generating the composite evaluator.

16. The non-transitory computer-readable medium of claim 13,
   wherein the one or more instructions, to cause the device to generate the composite actuator, cause the device to:
      in a first traversal, generate an agent control flow graph from the CSG beginning at a root node;
      in a second traversal, replace each node in the agent control flow graph with a specification of a related automated task performed by a digital agent represented by the node; and
      generate executable code for performing the composite process based on the specification of each related automated task.

17. The non-transitory computer-readable medium of claim 13,
   wherein each of the cooperation densities corresponds to at least one of a data cooperation or a temporal cooperation.

18. The non-transitory computer-readable medium of claim 13, wherein the one or more instructions further cause the device to:
   create a candidate composite agent; and
   add the candidate composite agent to a database of composite agents in response to a user input.

19. The non-transitory computer-readable medium of claim 13,
   wherein the edge weight decay function is an exponential weighted moving average function based on cooperation distance metrics between edge-connected nodes.

20. The computer-implemented method of claim 1,
   wherein the edge weight decay function is an exponential weighted moving average function based on cooperation distance metrics between edge-connected nodes.

* * * * *